US012315944B2

(12) United States Patent
Zheng et al.

(10) Patent No.: US 12,315,944 B2
(45) Date of Patent: May 27, 2025

(54) BATTERY CELL, BATTERY MODULE, BATTERY PACK, DEVICE USING BATTERY CELL AS POWER SOURCE, AND ASSEMBLING METHOD OF BATTERY CELL

(71) Applicant: CONTEMPORARY AMPEREX TECHNOLOGY (HONG KONG) LIMITED, Hong Kong (CN)

(72) Inventors: Yulian Zheng, Ningde (CN); Xiaoping Zhang, Ningde (CN); Peng Wang, Ningde (CN); Zhanyu Sun, Ningde (CN)

(73) Assignee: Contemporary Amperex Technology (Hong Kong) Limited, Hong Kong (CN)

(*) Notice: Subject to any disclaimer, the term of this patent is extended or adjusted under 35 U.S.C. 154(b) by 171 days.

(21) Appl. No.: 16/977,780

(22) PCT Filed: Nov. 25, 2019

(86) PCT No.: PCT/CN2019/120647
§ 371 (c)(1),
(2) Date: Sep. 2, 2020

(87) PCT Pub. No.: WO2021/102638
PCT Pub. Date: Jun. 3, 2021

(65) Prior Publication Data
US 2021/0249723 A1    Aug. 12, 2021

(51) Int. Cl.
H01M 50/204    (2021.01)
H01M 50/148    (2021.01)
(Continued)

(52) U.S. Cl.
CPC ....... H01M 50/204 (2021.01); H01M 50/148 (2021.01); H01M 50/183 (2021.01);
(Continued)

(58) Field of Classification Search
CPC ............ H01M 50/204; H01M 50/543; H01M 50/183; H01M 50/593; H01M 50/148; H01M 2220/20
(Continued)

(56) References Cited

U.S. PATENT DOCUMENTS 10,205,141 B2    2/2019    Guo et al.
10,319,975 B2    6/2019    Guen et al.
(Continued)

FOREIGN PATENT DOCUMENTS

CN    105591062 A    5/2016
CN    106684267 A    5/2017
(Continued)

OTHER PUBLICATIONS

Wang (translation) (Year: 2019).*
(Continued)

Primary Examiner — Matthew T Martin
Assistant Examiner — Paul Christian St Wyrough
(74) Attorney, Agent, or Firm — STERNE, KESSLER, GOLDSTEIN & FOX P.L.L.C.

(57) ABSTRACT

The present disclosure provides a battery cell, a battery module, a battery pack, a device using the battery cell as a power source, and an assembling method of the battery cell, wherein the battery cell comprising an electrode assembly (20) and an insulating support plate (50), the electrode assembly (20) comprises a main body portion (22) and a tab (21) connected to the main body portion (22), the insulating support plate (50) comprises a first support portion (51) and a second support portion (52) connected to the first support portion (51), the first support portion (51) protrudes in a direction approaching the main body portion (22) relative to the second support portion (52) such that a first gap is formed between the second support portion (52) and the
(Continued)

main body portion (22), and at least a portion of the tab (21) is located in the first gap. The first gap formed between the second support portion and the main body portion can accommodate at least a portion of the tab to effectively protect the tab, prevent the tab from being compressed, reduce damages to the tab, and increase the service life of the battery.

14 Claims, 10 Drawing Sheets

(51) Int. Cl.
*H01M 50/183* (2021.01)
*H01M 50/543* (2021.01)
*H01M 50/593* (2021.01)

(52) U.S. Cl.
CPC ....... *H01M 50/543* (2021.01); *H01M 50/593* (2021.01); *H01M 2220/20* (2013.01)

(58) Field of Classification Search
USPC .......................................................... 329/99
See application file for complete search history.

(56) References Cited

U.S. PATENT DOCUMENTS

| | | | |
|---|---|---|---|
| 10,476,048 B2 | 11/2019 | Guo et al. | |
| 10,629,866 B2 | 4/2020 | Guo et al. | |
| 2016/0099444 A1 | 4/2016 | Park et al. | |
| 2016/0380299 A1* | 12/2016 | Umeyama | H01M 4/505 429/94 |
| 2019/0363316 A1 | 11/2019 | Lee | |
| 2021/0066700 A1 | 3/2021 | Wang et al. | |
| 2021/0083256 A1 | 3/2021 | Liu et al. | |

FOREIGN PATENT DOCUMENTS

| | | | | |
|---|---|---|---|---|
| CN | 208189697 U | | 12/2018 | |
| CN | 208256820 U | * | 12/2018 | |
| CN | 109698385 A | | 4/2019 | |
| CN | 112771714 A | | 5/2021 | |
| EP | 3855558 A1 | | 7/2021 | |
| JP | 08153510 A | * | 6/1996 | |
| WO | WO-2018147603 A1 | * | 8/2018 | ........ H01M 10/0431 |
| WO | 2019114780 A1 | | 6/2019 | |
| WO | WO-2019179232 A1 | * | 9/2019 | ........... H01M 10/38 |
| WO | 2021102638 A1 | | 6/2021 | |

OTHER PUBLICATIONS

Lee (numbered) (Year: 2018).*
Zeng (machine translation) (Year: 2018).*
JPH08153510A (translation) (Year: 1996).*
Extended European Search Report issued in European Application No. 19914697.8, dated Mar. 29, 2021, 7 pages.
Notice of Reasons for Refusal Issued by JPO for JP 2022-528956, mailed on Nov. 1, 2023, 3 pages.

* cited by examiner

BATTERY CELL, BATTERY MODULE, BATTERY PACK, DEVICE USING BATTERY CELL AS POWER SOURCE, AND ASSEMBLING METHOD OF BATTERY CELL

TECHNICAL FIELD

The present disclosure relates to a battery cell, battery module, battery pack, device using the battery cell as a power source, and assembling method of the battery cell.

BACKGROUND ART

At present, batteries are widely used in portable electronic devices (such as mobile phones, digital cameras, laptops, etc.), electric vehicles (such as electric bicycles, electric cars, etc.) and large and medium-sized electric energy storage facilities, and reliability of batteries is increasingly important.

A battery comprises a battery core. A tab is provided on top of the battery core. During assembly, in order to avoid short circuit between the tab and the bare core, an insulator is usually required to be provided on the core. In the related art, the insulator entirely is flat, which is prone to compress the tab, causing damages to the tab, and reducing the service life of the battery.

It should be noted that information revealed in the portion subtitled under "Background Art" of the present disclosure is only intended to promote understanding of the general background of the present disclosure, and should not be considered as an acknowledgment or any form of suggestion that the information constitutes the state of art that is already known to those skilled in the art.

SUMMARY OF INVENTION

The embodiments of the present disclosure provide a battery cell, battery module, battery pack, device using the battery cell as power source, and assembling method of the battery cell to reduce to compress the tab and increase the service life of the battery.

According to one aspect of the present disclosure, a battery cell is provided, the batter cell comprising:
an electrode assembly comprising a main body portion and a tab connected to the main body portion; and
an insulating support plate comprising a first support portion and a second support portion connected to the first support portion, the first support portion protrudes in a direction approaching the main body portion relative to the second support portion such that a first gap is formed between the second support portion and the main body portion, and at least a portion of the tab is located in the first gap.

In some embodiments, the tab comprises a first tab section connected to the main body portion and a second tab section located on a side of the first tab section away from the main body portion, the first tab section is located in the first gap.

In some embodiments, the second tab section is located on a side of the second support portion away from the first tab section.

In some embodiments, the first support portion abuts against the main body portion.

In some embodiments, the first support portion and the second support portion are both flat, and the first support portion and the second support portion are parallel to each other.

In some embodiments, one or more second support portions are provided on each of two sides of the first support portion.

In some embodiments, each of two sides of the first support portion is provided with two second support portions, and the there is a second gap between the two second support portions on the same side of the first support portion.

In some embodiments, the battery cell further comprises a cover plate assembly and a case in which the electrode assembly and the insulating support plate are disposed, the case has an opening, the cover plate assembly is configured to seal the opening, the first support portion is provided with a hook, and the cover plate assembly is provided with a first groove, wherein the hook is inserted into the first groove to connect the insulating support plate and the cover plate assembly.

In some embodiments, the first support portion is provided with a second groove, and the hook is disposed in the second groove.

In some embodiments, the battery cell further comprises an electrode terminal and a connecting sheet, and the connecting sheet is configured to electrically connect the tab and the electrode terminal.

In some embodiments, the battery cell further comprises an insulating member disposed between the insulation support plate and the connecting sheet.

In some embodiments, both the insulating support plate and the connecting sheet abut against the insulating member.

In some embodiments, the insulating support plate further comprises a carrying portion, the carrying portion protrudes in a direction approaching the connecting sheet relative to the first supporting portion, the carrying portion and the connecting sheet together limit a position of the insulating member.

According to another aspect of the present disclosure, a battery module is provided, the batter module comprising said battery cell.

The present disclosure also provides a battery pack including said battery module.

The present disclosure also provides a device using a battery cell as a power source, the device comprising said battery cell.

The present disclosure also provides an assembly method of said battery cell, comprising:
placing an insulating support plate on one side of the main body portion and placing the first support portion closer to the main body portion than the second support portion to form a first gap is formed between the second support portion and the main body portion; and
folding the tab to make at least a portion of the tab located in the first gap.

According to the above technical solution, in the embodiments of the present disclosure, the first support portion of the insulating support plate protrudes in a direction approaching the main body portion relative to the second support portion to form a first gap between the second support portion and the main body portion, wherein at least a portion of the tab is disposed in the first gap. As a space for accommodating at least a portion of the tab, the first gap can protect the tab, prevent the tab from being compressed, reduce damages to the tab, and increase the service life of the battery.

By means of the detailed description below of exemplary embodiments of the present disclosure with reference to the drawing attached thereto, further features and advantages of the present disclosure will become clearer.

BRIEF DESCRIPTION OF THE DRAWINGS

In order to more clearly explain the embodiments of the present disclosure or the technical solutions in the prior art, drawings used in the description of the embodiments or the prior art will be briefly described below. Obviously, the drawings in the following description are only some embodiments of the present disclosure. Those skilled in the art can obtain further embodiments and their drawings according to the embodiments shown in these drawings without any creative effort.

In the figures.

Figure 1:
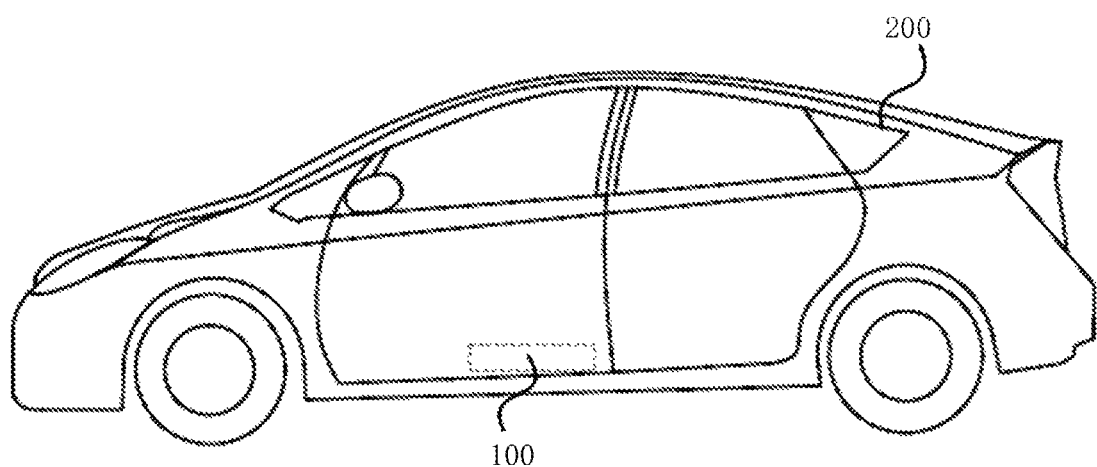
FIG. 1 is a schematic structural view of an embodiment of a device using a battery cell as a power source according to the present disclosure.

100. battery cell; 200. vehicle main body; 300. battery pack; 310. tank cover; 320. tank body; 330. batter module; 10. case; 11. opening; 20. electrode assembly; 21. tab; 22. main body portion; 211. first tab section; 212. second tab section; 213. third tab section; 214. tab seat; 30. cover plate assembly; 31. electrode terminal; 32. cover plate; 33. explosion-proof valve; 34. insulating side plate; 35. first groove; 36. second hole; 37. insulating baffle; 40. connecting sheet; 41. first connecting portion; 42. second connecting portion; 421. third groove; 43. connecting block; 44. first hole; 50. insulating support plate; 51. first support portion; 52. second support portion; 53. carrying portion; 531. fourth groove; 532. third hole; 54. hook; 541. first engaging portion; 542. second engaging portion; 5411. support rod; 5412. chuck; 55. second groove; 56. fourth hole; 57. fifth hole; 58. sixth hole; 60. insulating member.

DETAILED DESCRIPTION OF PREFERRED EMBODIMENTS

With reference to the figures of the embodiments of the present disclosure, a clear and complete description is given below for the technical solutions of the embodiments of the present disclosure. Obviously, the embodiments described below are only part of the embodiments, rather than all of the embodiments. The below description of at least one exemplary embodiment is actually only illustrative and cannot be taken as any restriction over the present disclosure and its application or use. All other embodiments that can be obtained by a person skilled in the art based on the embodiments of the present disclosure without any creative effort are included in the protection scope of the present disclosure.

In the description of the present disclosure, it should be understood that the use of words such as "first" and "second" to define parts is only for the convenience of distinguishing the corresponding parts. The above words neither indicate, unless otherwise stated, sequential or primary and secondary relationships, nor have any other special meanings, and therefore cannot be understood as limiting the scope of protection of this disclosure.

In the present disclosure, "more/a plurality of" refers to two or more (including two), and similarly, "more/a plurality of groups" refers to two or more groups (including two).

Besides, when an element is referred to as being "on" another element, it can be directly on the other element, or indirectly on the other element with one or more intermediate elements interposed therebetween. Besides, when an element is referred to as being "connected to" another element, it can be directly connected to the other element, or indirectly connected to the other element with one or more intermediate elements interposed therebetween.

For technology, process and apparatus already known by a person skilled in the related art, detailed discussion may not be given, but if appropriate, such technology, process and apparatus should be regarded as part of the patented specification.

Technical features involved in the different embodiments of the present disclosure described below can be combined with each other as long as they do not constitute a conflict with each other.

Referring to FIG. 1, the present disclosure provides a device using a battery cell 100 as a power source. The device using a battery cell 100 as a power source comprises the battery cell 100 and a driver configured to provide a driving force to the device, wherein the battery cell 100 is configured to provide electrical energy to the driver. The driving force of the device can be entirely electric energy, or partly electric energy and partly another energy source (such as mechanical energy). For example, the device may also include a power source such as an engine or the like that provides mechanical energy. Any device that uses the battery cell 100 as a power source falls within the protection scope of the present disclosure.

In the embodiment as shown in FIG. 1, the device using the battery cell 100 as a power source is a vehicle, and in another embodiments, the device using the battery cell 100 as a power source may be a movable device such as a ship, a small aircraft or the like. When the device using the battery cell 100 as a power source is a vehicle, the vehicle may be a new energy vehicle. The new energy vehicle can be a pure electric vehicle, a hybrid vehicle or a range extender.

Referring to FIG. 1, the vehicle includes a battery cell 100 and a vehicle body 200, wherein the battery cell 100 is disposed inside the vehicle body 200. The vehicle body 200 is further provided with a driving motor, wherein the driving motor is electrically connected to the battery cell 100 which provides power to the driving motor, and the driving motor is connected to wheels of the vehicle body 200 through a transmission mechanism so as to drive the vehicle. Particularly, the battery cell 100 may be horizontally disposed on a bottom of the vehicle body 200.

Figure 2:
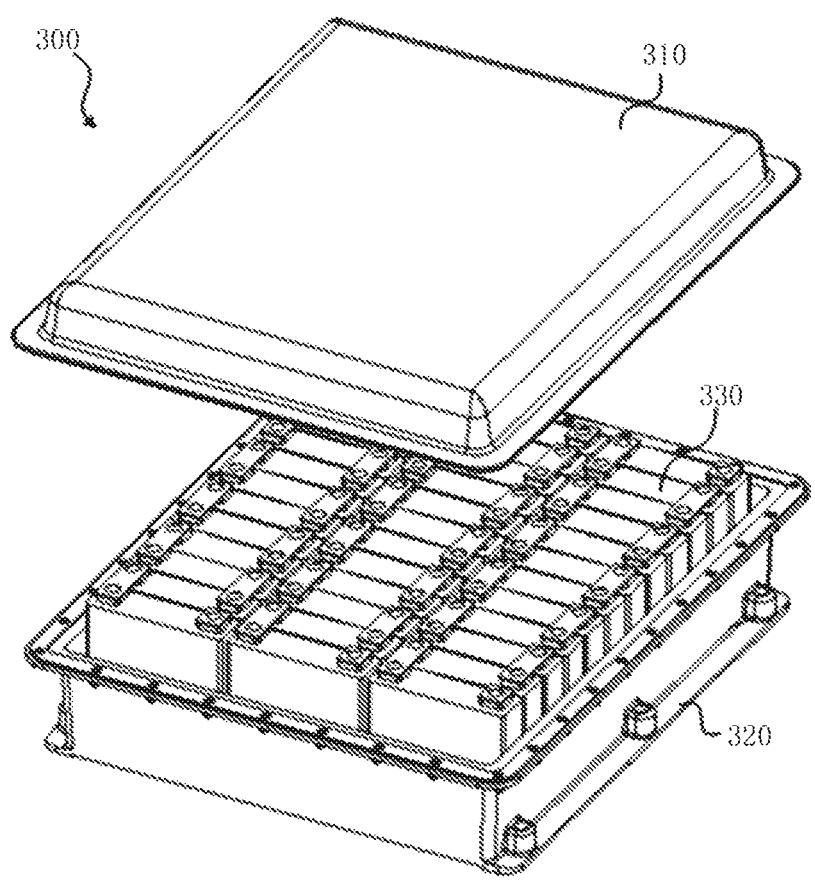
FIG. 2 is a schematic structural view of an embodiment of a battery pack according to the present disclosure.
Figure 3:
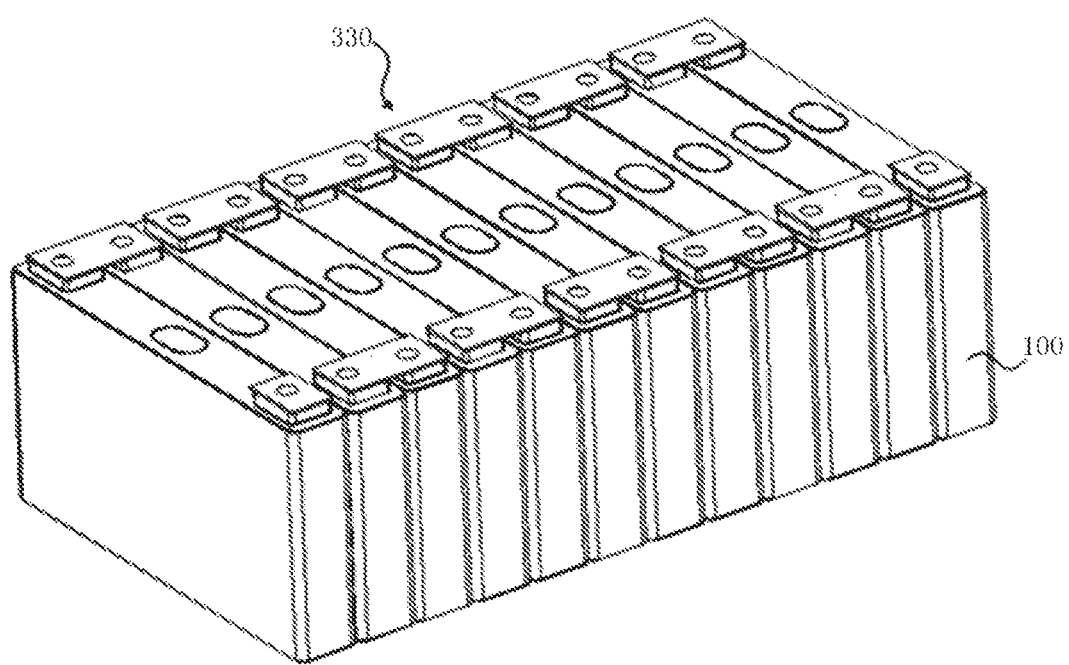
FIG. 3 is a schematic structural view of an embodiment of a battery module according to the present disclosure.

Specially, referring to FIG. 2 and FIG. 3, a plurality of battery cells 100 may constitute a battery module 330. The battery module 330 is mounted in a tank 320 and the tank 320 is sealed by a tank cover 310 to form a battery pack 300. The battery pack 300 has a high energy storage capacity, which can improve the endurance of the device using the battery cell 100 as a power source. The tank 320 and the tank cover 310 are connected in a detachable manner to facilitate replacement of the battery module 330.

Structure of the embodiment of the battery cell according to the present disclosure will be described below with reference to FIGS. 4 to 13.

Figure 4:
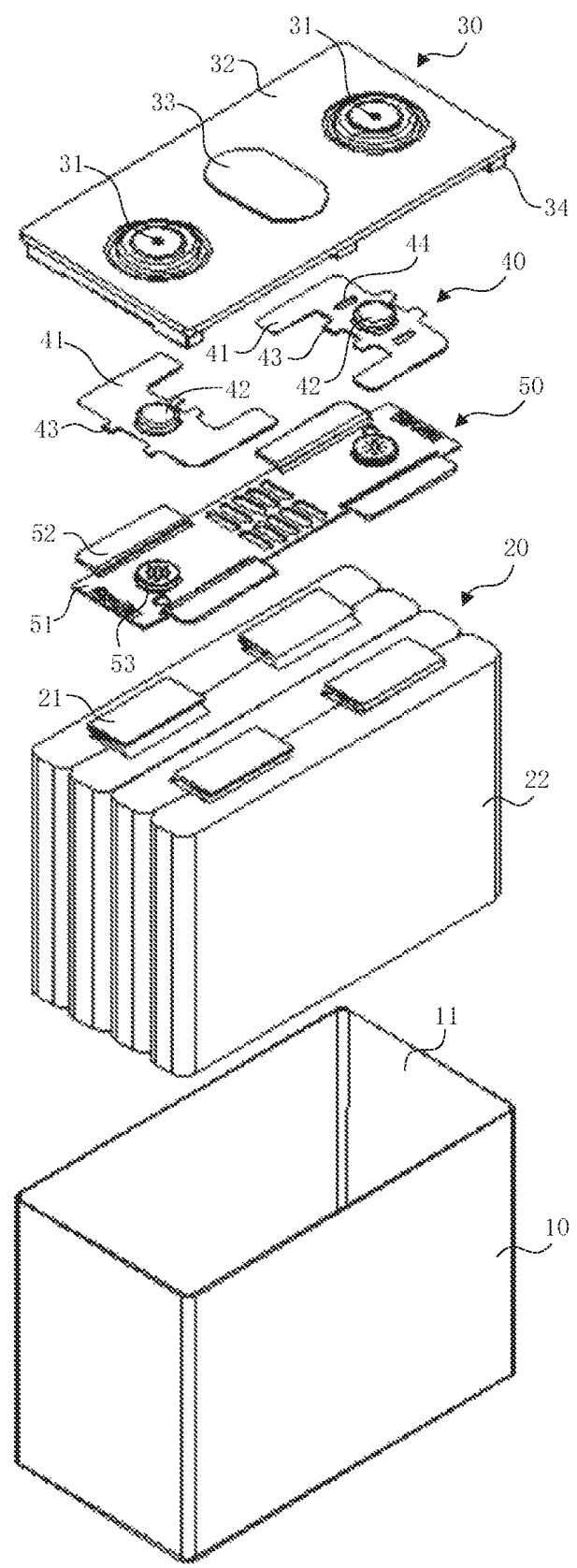
FIG. 4 is an explosive view of an embodiment of a battery cell according to the present disclosure.

Referring to FIG. 4, the battery cell 100 comprises a case 10, an electrode assembly 20, a cover plate assembly 30, a connecting sheet 40, and an insulating support plate 50.

An opening 11 is provided on the top of the case 10. The electrode assembly 20, the connecting sheet 40 and the insulating support plate 50 are all disposed inside the case 10, and the cover plate assembly 30 is configured to close the opening 11 of the case 10. The insulating support plate 50 is positioned above the electrode assembly 20, the connection piece 40 is positioned above the insulating support plate 50, and the insulating support plate 50 is connected to the case 10.

There are various options for the shape of the case 10. In the embodiment shown in FIG. 4, the shape of the case 10 is a cuboid, which matches a shape of the battery cell 100.

The electrode assembly 20 includes a tab 21 and a main body portion 22, and the tab 21 is connected to the main body portion 22. The electrode assembly 20 includes at least two tabs 21, which are a positive electrode tab and a negative electrode tab, respectively. Two main body portions 22 may share a same group of a positive electrode tab and a negative electrode tab.

In the embodiment shown in FIG. 4, the electrode assembly 20 comprises four tabs 21 and four main body portions 22, wherein the two main body portions 22 share one positive electrode tab 21 and one negative electrode tab 21, and the other two body portions 22 share another positive electrode tab 21 and another negative electrode tab 21. Four main body portions 22 are placed in a single case 10.

The cover plate assembly 30 comprises electrode terminals 31, a cover plate 32, an explosion-proof valve 33, and an insulating side plate 34. The electrode terminal 31 is mounted on the cover plate 32, and on two sides of the cover plate 32 are mounted with the insulating plate 34. The explosion-proof valve 33 is disposed on the cover plate 32 and between two electrode terminals 31. The explosion-proof valve 33 is also called as a pressure relief valve, which is configured to release part of a pressure when the pressure inside the battery cell 100 reaches a preset value to prevent the battery cell 100 from explosion.

The connecting sheet 40 comprises a first connecting portion 41 connected to the tab 21 and a second connecting portion 42 connected to the electrode terminal 31.

In the embodiment shown in FIG. 4, the battery cell 100 includes two connecting sheets 40 and two electrode terminals 31, wherein the first connecting portion 41 of one of the two connecting sheets 40 is connected to said two positive electrode tabs 21, and the second connecting portion 42 of said one of the two connecting sheets 40 is connected to the positive electrode terminal 31; the first connecting portion 41 of the other one of the two connecting sheets 40 is connected to said two negative electrode tabs 21, and the second connecting portion 42 of said the other one of the two connecting sheets 40 is connected to the negative electrode terminal 31.

The first connecting portion 41 is entirely U-shaped, and the two connecting sheets 40 are oppositely arranged such that the U-shaped openings of the two first connecting portions 41 are opposite to each other. The second connecting portion 42 protrudes from the first connecting portion 41 in a direction approaching the cover plate assembly 30 so as to be connected to the electrode terminal 31. The shape of the second connecting portion 42 is a circular to match a shape of the electrode terminal 31.

Each of two sides of an intermediate connecting section of the first connecting portion 41 is provided with a connecting block 43 to facilitate connection of the first connecting portion 41 to the tab 21 and also facilitate positioning of the connecting sheets 40. The first connecting portion 41 of one of the connecting sheets 40 is provided with two first holes 44 so as to distinguish the two connecting sheets 40 and facilitate positioning of the connecting sheets 40.

The insulating support plate 50 comprises a first support portion 51, a second support portion 52 and a carrying portion 53, the first support portion protrudes in a direction approaching the main body portion relative to the second support portion such that a first gap formed between the second support portion 52 and the main body portion 22, and at least a portion of the tab 21 is located in the first gap. As a space for accommodating at least a portion of the tab, the first gap effectively protects the tab 21, prevents the tab 21 from being compressed, reduces damages to the tab 21, and increases the service life of the battery.

Figure 5:
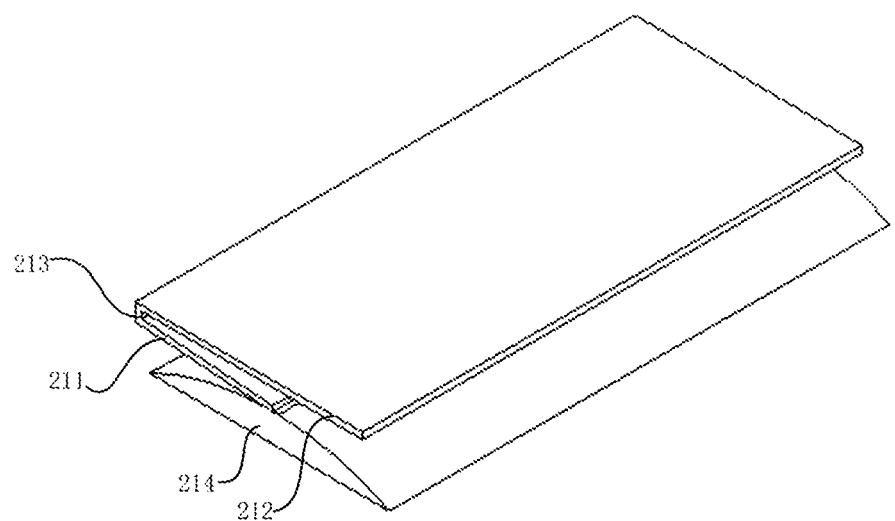
FIG. 5 is a schematic structural view of an embodiment of a tab in an embodiment of a battery cell according to the present disclosure.

Referring to FIG. 5, the tab 21 comprises a first tab section 211 connected to the main body section 22 and a second tab section 212 located on a side of the first tab section 211 away from the main body portion 22, the first tab section 211 is located in the first gap.

The tab 21 further comprises a third tab section 213 connected between the first tab section 211 and the second tab section 212.

In the embodiment shown in FIG. 5, the first tab section 211 and the second tab section 212 are arranged in parallel, and the third tab section 213 are perpendicularly arranged relative to the first tab section 211 and the second tab section 212. The tab 21 is bent to form a structure with an opening on a side opposite to the third tab section 213. In another embodiments, there may be other options for the shape of the tab 21 after bending.

The tab 21 further comprises a tab seat 214 connected to the main body portion 22, and the first tab section 211 is connected to the tab seat 214. By providing the tab seat 214, reliability of connection of the tab 21 with the main body portion 22 can be improved, and the tab 21 can be prevented from being broken during the bending process.

The first tab section 211, the second tab section 212, the third tab section 213 and the tab seat 214 can be separate from one another but connected together or can be formed integrally.

Figure 6:
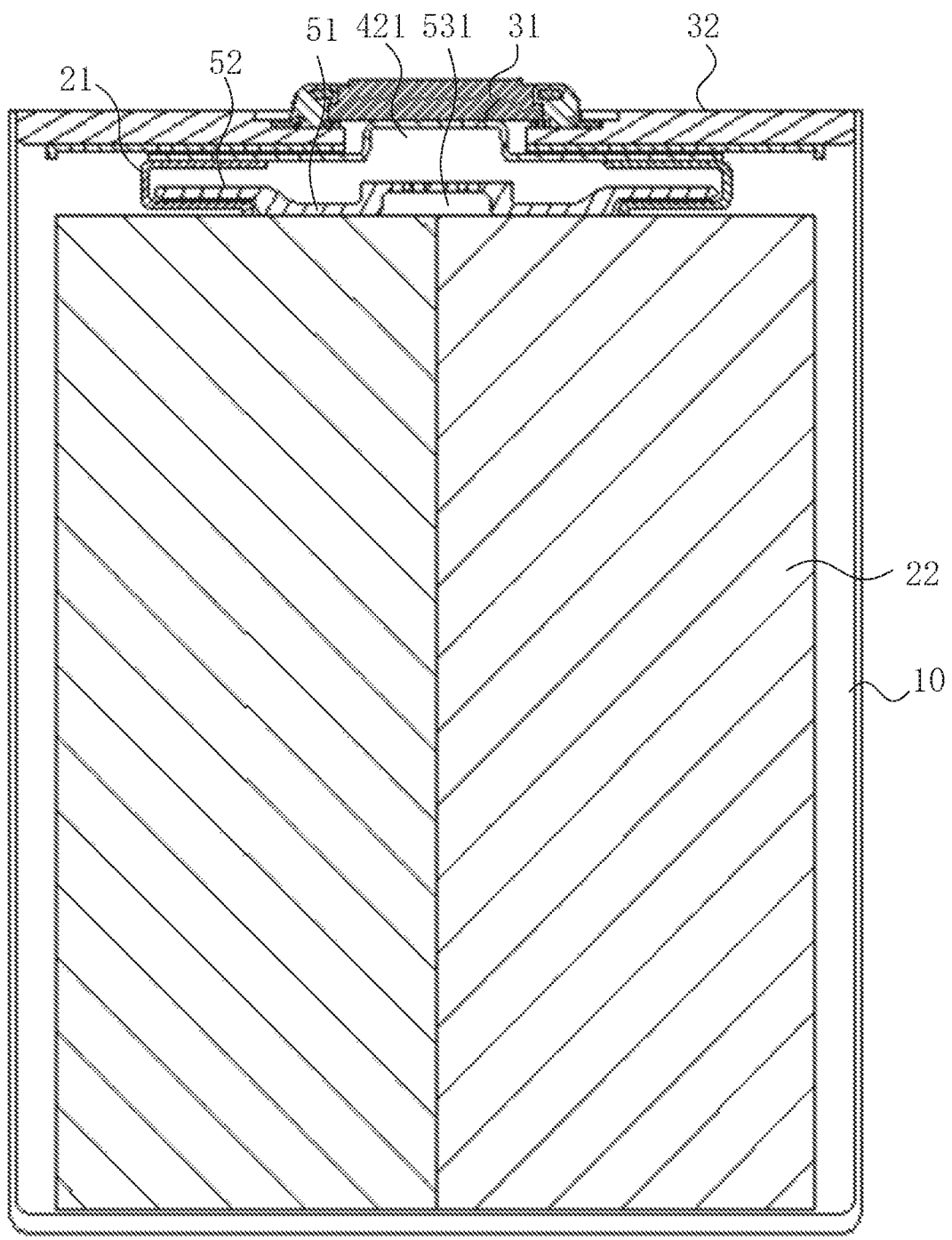
FIG. 6 is a sectional view of the embodiment as shown in FIG. 4.

Referring to FIG. 6, the second tab section 212 is located on a side of the second support portion 52 away from the first tab portion 211 so as to electrically connect the second tab section 212 and the first connecting portion 41. The second support portion 52 is located between the first tab section 211 and the second tab section 212. By providing the second support portion 52, the first tab section 211 can be well protected from being compressed while not affecting the connection between the second tab section 212 and the connecting sheet 40.

The first support portion 51 and the main body portion 22 can be in direct contact or indirect contact, that is, an intermediate member can be provided between the first support portion 51 and the main body portion 22.

In the embodiment shown in FIG. 6, the first support portion 51 and the main body portion 22 are in direct contact with each other, which can not only produce a supporting and insulating effect, but also eliminate an intermediate connecting member, decrease a size of the battery cell 100 and reduce a weight of the battery cell 100.

The first support portion 51 abuts the main body portion 22. The first support portion 51 can be in contact but not connected with the main body portion 22, or the first support portion 51 can be in contact and connected with the main body portion 22.

The first support portion 51 and the second support portion 52 are both flat, and the first support portion 51 and the second support portion 51 are parallel to each other. Such a structure has good stability and is easy to be assembled.

One or more second support portions are provided on each of two sides of the first support portion 51 so as to facilitate providing protection to the tab 21 on each of two sides of the first support portion 51.

In the embodiment as shown in FIGS. 4 and 6, each of two sides of the first support portion 51 is provided with two second support portions 52, and there is a second gap between the two second support portions on the same side of the first support portion 51. Advantage of such an arrangement lies in that firstly, it can prevent mis-conduction between the positive and negative electrodes; and secondly, when a flame-retardant device is provided in the second gap, it can reduce an influence thereof on a flame-retardant effect of the flame-retardant device.

Referring to FIG. 6, the second connecting portion 42 protrudes in a direction approaching the cover plate assembly 30 relative to the first connecting portion 41 such that a third groove 421 is formed on a side of the second connecting portion 42 away from the cover plate assembly 30. The carrying portion 53 protrudes in a direction approaching the cover plate assembly 30 relative to the first support portion 51 such that a fourth groove 531 is formed on a side of the carrying portion 53 away from the cover plate assembly 30. The third groove 421 and the fourth groove 531 can be filled with some breathable material as support.

Figure 7:
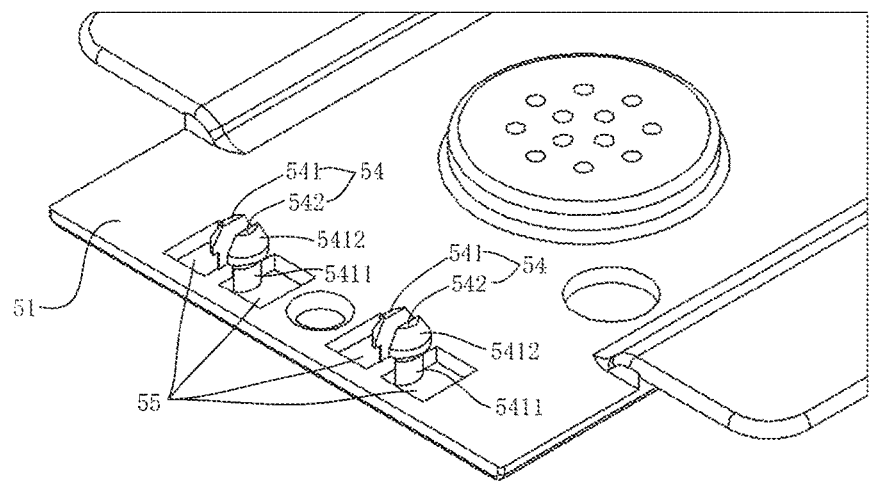
FIG. 7 is a schematic structural view of a portion of an insulating support plate in an embodiment of a battery cell according to the present disclosure.
Figure 8:
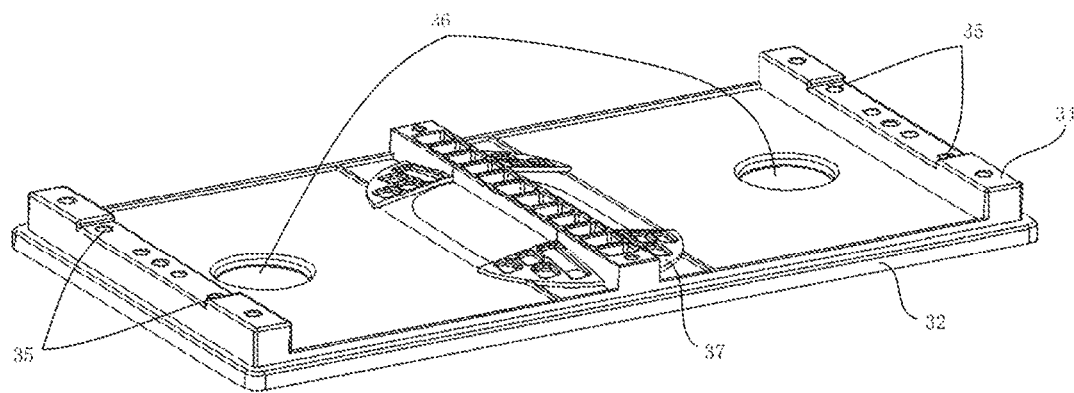
FIG. 8 is a bottom view of a cover plate assembly in an embodiment of a battery cell according to the present disclosure.

Referring to FIGS. 7 and 8, in order to facilitate connection between the cover plate assembly 30 and the insulating support plate 50, a hook 54 is provided on the first support portion 51, and a first groove 35 is provided on the cover plate 32 of the cover plate assembly 30, wherein the hook 54 is inserted into the first groove 35 to connect the insulating support plate 50 and the cover plate assembly 30. Such a connecting manner has a simple structure and is convenient to operate and has good reliability.

The hook 54 comprises a first engaging portion 541 and a second engaging portion 542 which are arranged symmetrically. A third gap is formed between the first engaging portion 541 and the second engaging portion 542. The first engaging portion 541 and the second engaging portion are relatively moveable before entering the first groove 35 to reduce the third gap so as to smoothly enter the first groove 35. After entering the first groove 35, the first engaging portion 541 and the second engaging portion 542 are able to reset to restore the third gap so as to engage with the first groove 35. The first engaging portion 541 and the second engaging portion 542 each comprises a support rod 5411 and a chuck 5412 connected to an end of the support rod 5411. One side of the chuck 5412 away from the support rod 5411 is narrow and another side of the chuck 5412 close to the support rod 5411 is wide such that the chuck 5412 can smoothly enter the first groove 35.

Further, the first support portion 51 is provided with a second groove 55, and the hook 54 is disposed in the second groove 55. In such a manner, the hook 54 can be partially sunk into the second groove 55 such as to improve the connection reliability by increasing an length of the hook 54, and further, improve a sealing effect of the cover plate assembly 30 against the case 10 by reducing a gap between the cover plate assembly 30 and the insulating support plate 50, and the overall structure is more compact such that the battery cell has a reduced volume.

Figure 9:
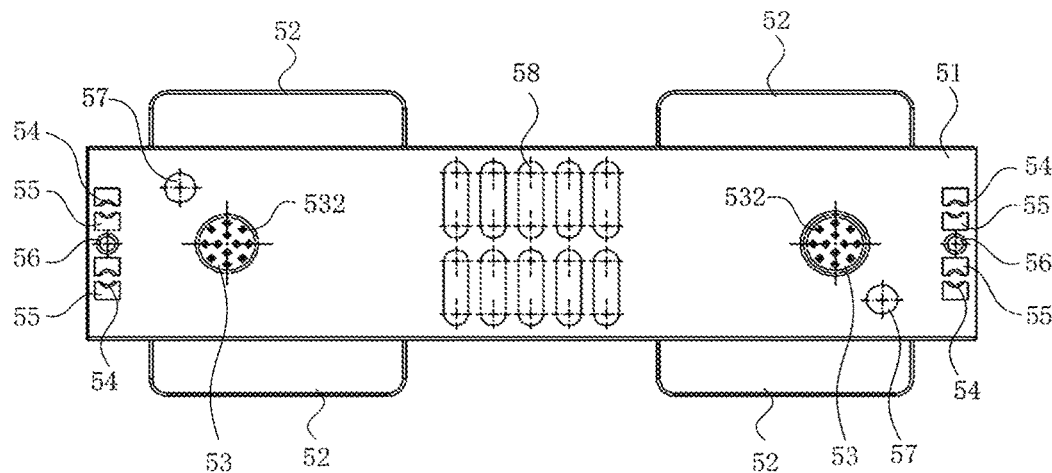
FIG. 9 is a schematic structural view of an insulating support plate in an embodiment of a battery cell according to the present disclosure.

In the embodiment shown in FIG. 9, the hook 54 is in a number of four. Each of two ends of the first support portion 51 is provided with two hooks 54. Each hook 54 corresponds to two second grooves 55, and the first engaging portion 541 and the second engaging portion 542 of the hook 54 are respectively disposed in the corresponding second grooves 55.

The cover plate 32 is also provided with a second hole 36, and the electrode terminal 31 can be mounted at the second hole 36. The cover plate 32 is also provided with an insulating baffle 37. The insulating baffle 37 is provided with a plurality of holes configured for ventilation to release a pressure inside the battery cell 100.

As shown in FIG. 9, an upper surface of the carrying portion 53 of the insulating support plate 50 can be used as a glue applying portion to be applied with a solid glue so as to provide a connection of the carrying portion 53 with a component (such as an insulating member 60 to be mentioned below) located thereon. The carrying portion 53 is provided with a plurality of third holes 532 for preventing glue overflow.

In the embodiment shown in FIG. 9, the shape of the carrying portion 53 is a circular, and the plurality of third holes 532 are evenly arranged in a circumferential direction and may be arranged in two rings.

A fourth hole 56 is provided on each of two ends of the first support portion 51, and the fourth hole 56 is provided between the two second grooves 55. When the insulating support plate 50 is assembled, whether the insulating support plate 50 is mounted in place can be detected by detecting a position of the fourth hole 56.

A fifth hole 57 is provided on each of two diagonal corners of the first support portion 51. By detecting a position of the fifth hole 57, the insulating support plate 50 can be easily positioned and the positive and negative electrodes can be prevented from being reversed.

A plurality of sixth holes 58 are provided in a center of the first support portion 51 for ventilation.

Figure 10:
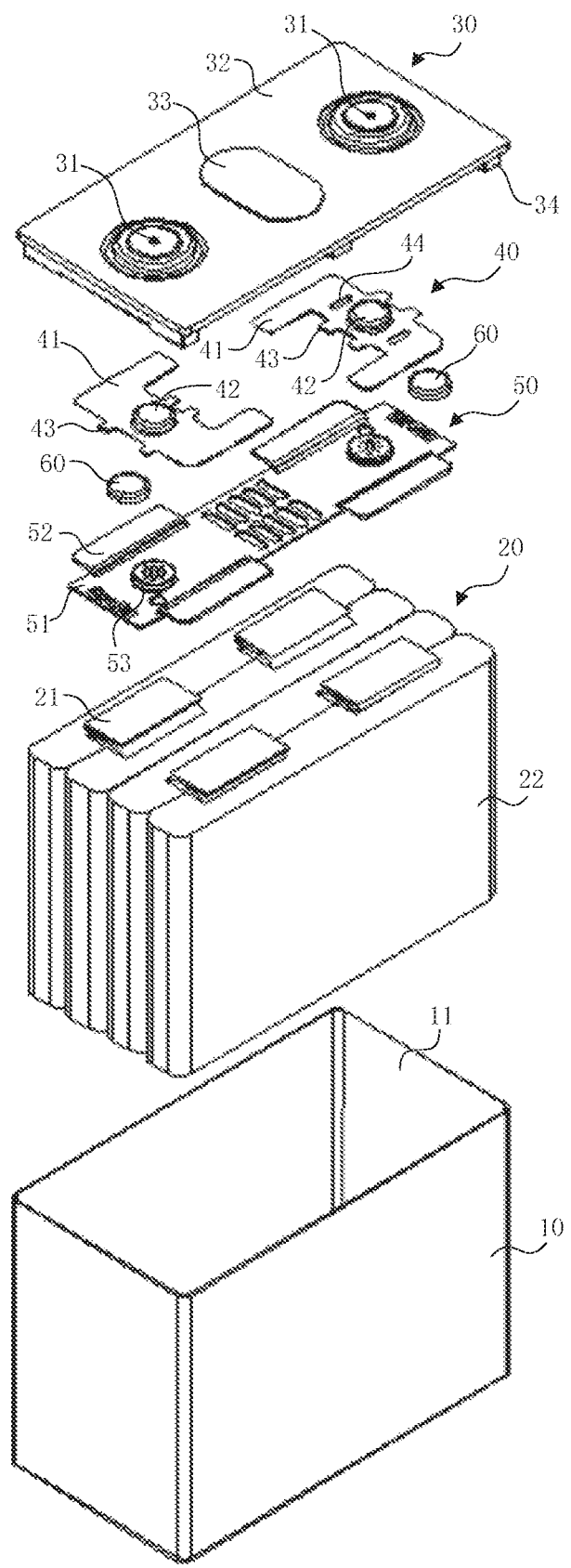
FIG. 10 is an explosive view of another embodiment of a battery cell according to the present disclosure.

As shown in FIG. 10, the battery cell 100 further comprises an insulating member 60 disposed between the insulating support plate 50 and the connecting sheet 40. Further, the insulating member 60 can be disposed between the insulating support plate 50 and the second connecting portion 42 of the connecting sheet 40.

During the assembly process of the battery cell 100, laser welding may be used. During the laser welding, impurities (such as metal shavings) may be generated. The impurities may fall into the third groove 421 of the second connecting portion 42, and at the same time, impurities from the external environment may also fall into the third groove 421. When the battery cell 100 vibrates, the impurities may fall into the electrode assembly 20, thereby causing a short circuit risk. Therefore, if the insulating member 60 is provided between the insulation support plate 50 and the second connecting portion 42 of the connecting sheet 40, even if impurities of the second connecting portion 42 fall, they will be caught by the insulating member 60, thereby preventing the impurities from entering the electrode assembly 20 to cause a short circuit, which improves safety performance of the battery cell.

By providing the insulating member 60, a short circuit between the connecting sheet 40 and the main body portion 22 can be effectively prevented.

Both the insulating support plate 50 and the connecting sheet 40 abut against the insulating member 60. By providing the insulating support plate 50 and the connecting sheet 40, a position of the insulating member 60 can be limited to ensure stability of the insulating member 60.

Further, the position of the insulating member 60 can be limited by the carrying portion 53 together and the connecting sheet 40.

Figure 11:
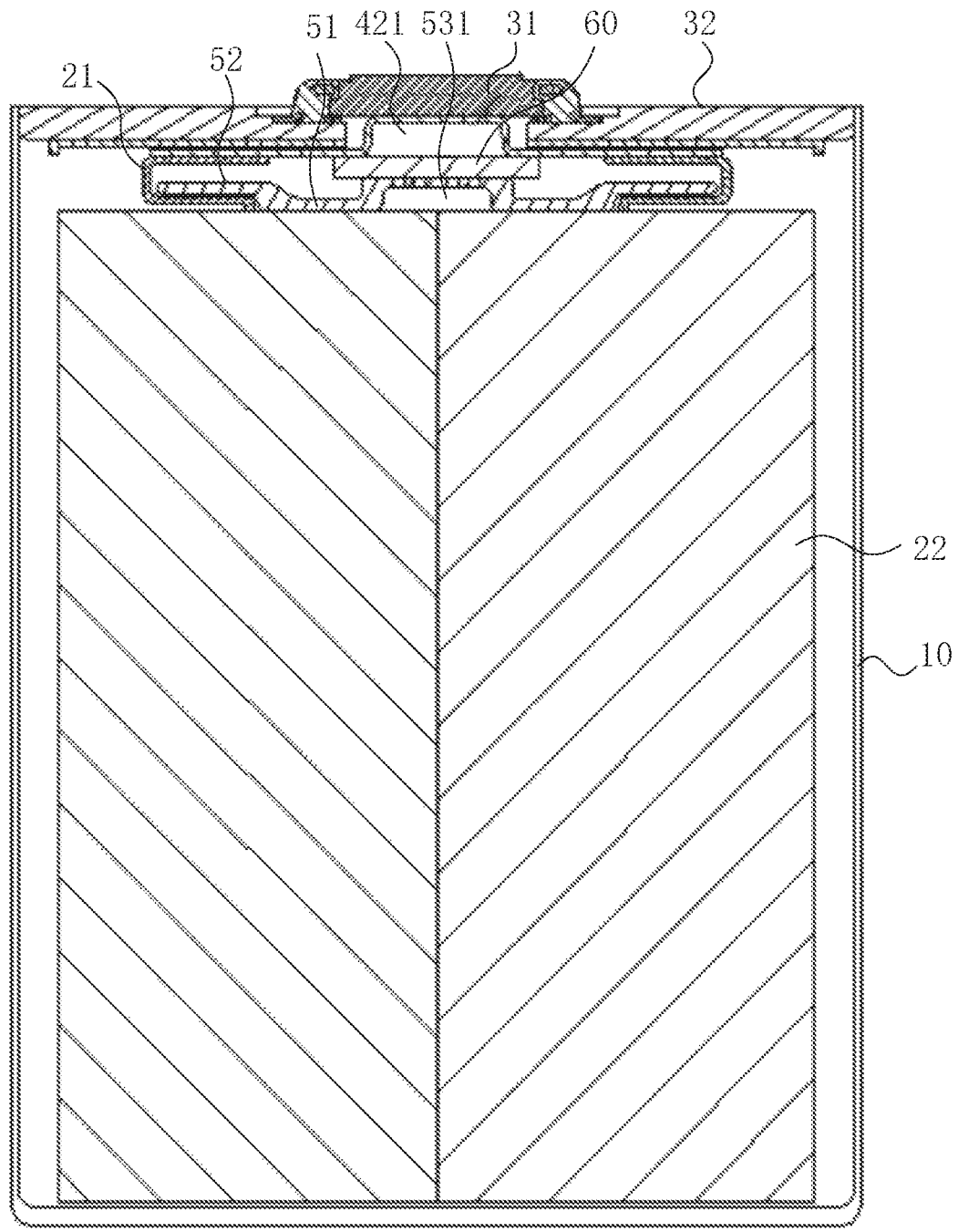
FIG. 11 is a sectional view of a further embodiment of a battery cell according to the present disclosure.

In the embodiment as shown in FIG. 11, the second connecting portion 42 protrudes in a direction approaching the electrode terminal 31 relative to the first connecting portion 41 and a third groove 421 is formed on a side of the second connecting portion 42 away from the electrode terminal 31. The insulating member 60 covers an open of the third groove 421. The carrying portion 53 cooperates with a side wall of the open of the third groove 421 to limit a position of the insulating member 60.

A position of each of two sides of the insulating member 60 is limited by the side wall of the open of the third groove 421 and the carrying portion 53 to ensure stability of the insulating member 60 and prevent the insulation protection member 60 from moving.

Figure 12:
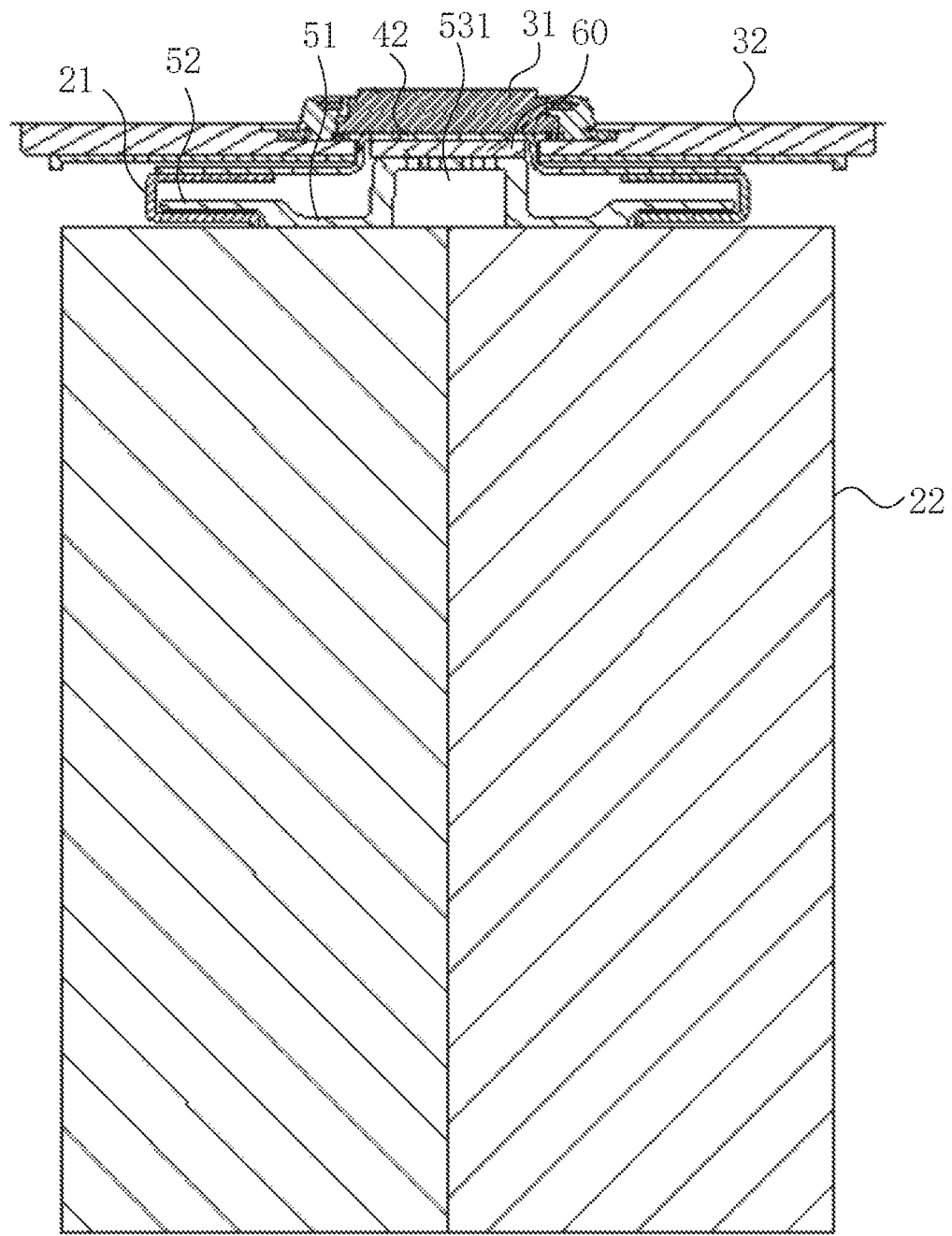
FIG. 12 is a sectional view of a further yet embodiment of a battery cell according to the present disclosure.

In the embodiment shown in FIG. 12, the insulating member 60 is disposed inside the third groove 421.

Further, the carrying portion 53 extends into the third groove 421 and cooperates with a bottom of the third groove 421 to limit the position of the insulating member 60. A position of each of two sides of the insulating member 60 is limited by the bottom of the third groove 421 and the carrying portion 53 to ensure stability of the insulating member 60.

The insulating member 60 can comprise a foam, an adhesive tape, a solid glue or the like.

Wherein, the solid glue may comprise a solid glue stick or a glue formed by a glue solidified by being applied on the insulating support plate 50.

Based on said battery cell, the present disclosure also provides an assembling method of a battery cell, the method comprising:

placing an insulating support plate 50 on one side of the main body portion 22 and placing the first support portion 51 closer to the main body portion 22 than the second support portion 52 to form a first gap between the second support portion 52 and the main body portion 22; and folding the tab 21 to make at least a portion of the tab 21 located in the first gap.

Figure 13:
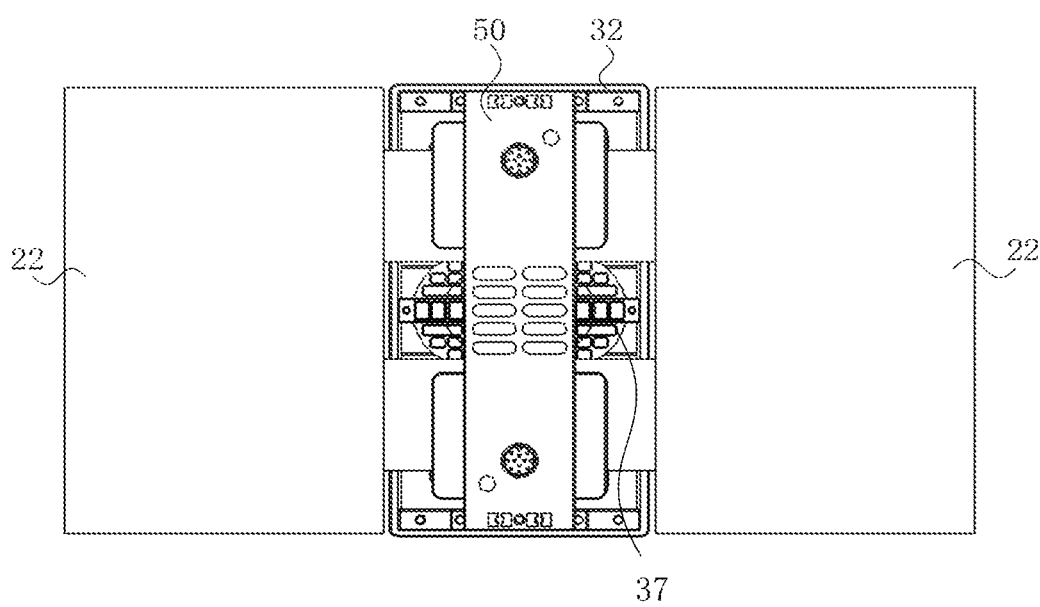
FIG. 13 is an extended view of an embodiment of a battery cell of the present disclosure.

Referring to the extended view as shown in FIG. 13, when assembling the battery cell 100, firstly, placing the second tab section 212 of the tab 21 on a side of the second support portion 52 away from the first support portion 51, then, folding the tab 21 in a direction perpendicular to the second support portion 52 such that the third tab section 213 is located on a side of the second support portion 52, and the first tab section 211 and the tab seat 214 are respectively bent towards a side of the second support portion 52 close to the first support portion 51, to thereby complete initial assembling of the tab 21 and the insulating support plate 50.

In particular, before assembling the tab 21 and the insulating support plate 50, assembling of the second tab section 212 of the tab 21, the cover plate assembly 30, the connecting sheet 40, the insulating member 60 and the insulating support plate 50 can be completed firstly, the assembling comprising:

positioning the electrode assembly 20 and the connecting sheet 40, placing the second tab section 212 of the tab 21 on a first side of the connecting sheet 40, and connecting the first connecting portion 41 of the connecting sheet 40 and the second tab section 212;

positioning the cover plate assembly 30 and the connecting sheet 40, placing the electrode terminal 31 on a second side of the connecting sheet 40, and connecting the second connecting portion 42 of the connecting sheet 40 and the electrode terminal 31;

providing the insulating member 60 on the insulating support plate 50;

providing an insulating support plate 50 on the first side of the connecting sheet 40;

abutting the insulating support plate 50 against the first side of the insulating member 60, abutting the second connecting portion 42 of the connection piece 40 against the second side of the insulating member 60, such that a position of the insulating member 60 is fixed, and at the same time, connecting the insulating support plate 50 to the cover plate assembly 30 such that the second tab section 212 of the tab 21, the cover plate assembly 30, the connecting sheet 40, the insulating member 60 and the insulating support plate 50 are relatively fixed. Wherein, the first side and the second side of the connecting sheet 40 are opposite sides, and the first side and the second side of the insulating member 60 are opposite sides.

Advantageous technical effect of said embodiments of a battery cell is also applicable to a battery module, a battery pack, a device using the battery cell as a power source, and an assembling method of the battery cell.

Finally, it should be noted that, all the above embodiments are only intended to describe technical solutions of the present disclosure, rather than to limit the same. Although a detailed description is given to the present disclosure with reference to preferred embodiments, a person skilled in the art should understand that, modifications or equivalent replacements may be made to the embodiments according to the present disclosure or part of the technical features thereof so far as such modifications or equivalent replacements do not go away from the substance of the present disclosure, and such modifications or equivalent replacements shall be included in the protection scope of the technical solutions according to the present disclosure.

What is claimed is:

1. A battery cell, comprising:
    an electrode assembly (20) comprising a main body portion (22) and a tab (21) connected to the main body portion (22);
    an insulating support plate (50) comprising a first support portion (51) and a second support portion (52) connected to the first support portion (51), the first support portion (51) protruding in a direction approaching the main body portion (22) relative to the second support portion (52) such that a first gap is formed between the second support portion (52) and the main body portion (22), and at least a portion of the tab (21) is located in the first gap;
    a cover plate assembly (30) comprising electrode terminals (31);

a connecting sheet (40) comprising a first connecting portion (41) connected to the tab (21) and a second connecting portion (42) connected to one of the electrode terminals (31) by welding; and an insulating member (60) disposed between the insulating support plate (50) and the connecting sheet (40), covering a portion where the second connecting portion (42) is welded to the electrode terminal (31), wherein both the insulating support plate (50) and the connecting sheet (40) abut against the insulating member (60), and wherein the insulating support plate (50) further comprises a carrying portion (53) protruding in a direction approaching the connecting sheet (40) relative to the first support portion (51) such that a fourth groove (531) is formed on a side of the carrying portion (53) away from the cover plate assembly (30), and the carrying portion (53) and the connecting sheet (40) together limit a position of the insulating member (60), and the carrying portion (53) is arranged opposite to the corresponding electrode terminal (31).

2. The battery cell according to claim 1, wherein the tab (21) comprises a first tab section (211) connected to the main body section (22) and a second tab section (212) located on a side of the first tab section (211) away from the main body portion (22), the first tab section (211) is located in the first gap.

3. The battery cell according to claim 2, wherein the second tab section (212) is located on a side of the second support portion (52) away from the first tab section (211).

4. The battery cell according to claim 1, wherein the first support portion (51) abuts against the main body portion (22).

5. The battery cell according to claim 1, wherein the first support portion (51) and the second support portion (52) are both flat, and the first support portion (51) and the second support portion (51) are parallel to each other.

6. The battery cell according to claim 1, wherein one or more second support portions (52) are provided on each of two sides of the first support portion (51).

7. The battery cell according to claim 6, wherein each of two sides of the first support portion (51) is provided with two second support portions (52), and there is a second gap between the two second support portions (52) on the same side of the first support portion (51).

8. The battery cell according to claim 1, further comprising a case (10) in which the electrode assembly (20) and the insulating support plate (50) are disposed, the case (10) has an opening (11), the cover plate assembly (30) is configured to seal the opening (11), the first support portion (51) is provided with a hook (54), and the cover plate assembly (30) is provided with a first groove (35), wherein the hook (54) is inserted into the first groove (35) to connect the insulating support plate (50) and the cover plate assembly (30).

9. The battery cell according to claim 8, wherein the first support portion (51) is provided with a second groove (55), and the hook (54) is disposed in the second groove (55).

10. A battery module, comprising the battery cell according to claim 1.

11. A battery pack, comprising the battery module according to claim 10.

12. A device using a battery cell as a power source, the device comprising the battery cell according to claim 1.

13. An assembly method of the battery cell according to claim 1, comprising:

placing the insulating support plate (50) on one side of the main body portion (22) and placing the first support portion (51) closer to the main body portion (22) than the second support portion (52) to form a first gap between the second support portion (52) and the main body portion (22); and folding the tab (21) to make at least a portion of the tab (21) located in the first gap.

14. The battery cell according to claim 1, wherein the connecting sheet (40) is configured to electrically connect the tab (21) and the electrode terminal (31).

* * * * *